United States Patent
Ueba et al.

(10) Patent No.: US 8,233,497 B2
(45) Date of Patent: Jul. 31, 2012

(54) COMMUNICATION CONTROL APPARATUS

(75) Inventors: Takuma Ueba, Kawasaki (JP); Toru Uchiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 438 days.

(21) Appl. No.: 12/475,894

(22) Filed: Jun. 1, 2009

(65) Prior Publication Data

US 2010/0014452 A1    Jan. 21, 2010

(30) Foreign Application Priority Data

Jul. 15, 2008   (JP) ................................. 2008-184184

(51) Int. Cl.
H04L 12/413 (2006.01)
(52) U.S. Cl. ....................................... 370/445; 370/461
(58) Field of Classification Search .................. None
See application file for complete search history.

(56) References Cited

U.S. PATENT DOCUMENTS

| | | | |
|---|---|---|---|
| 5,740,167 A | 4/1998 | Taketsugu et al. | |
| 6,091,741 A | 7/2000 | Fujiwara et al. | |
| 7,054,329 B2* | 5/2006 | Cervello et al. | 370/447 |
| 7,154,854 B1* | 12/2006 | Zweig et al. | 370/236 |
| 7,542,478 B1* | 6/2009 | Ozer et al. | 370/447 |
| 7,864,674 B2* | 1/2011 | Benveniste | 370/230 |
| 2002/0167960 A1* | 11/2002 | Garcia-Luna-Aceves | 370/442 |
| 2002/0167963 A1* | 11/2002 | Joa-Ng | 370/447 |
| 2005/0041616 A1* | 2/2005 | Ginzburg et al. | 370/328 |
| 2005/0129051 A1* | 6/2005 | Zhu et al. | 370/445 |
| 2005/0141476 A1* | 6/2005 | Choi et al. | 370/348 |
| 2008/0144500 A1* | 6/2008 | Chen et al. | 370/235 |

FOREIGN PATENT DOCUMENTS

| | | |
|---|---|---|
| JP | 8-274788 | 10/1996 |
| JP | 9-135248 | 5/1997 |

* cited by examiner

*Primary Examiner* — Andrew Chriss
*Assistant Examiner* — Roberta A Shand
(74) *Attorney, Agent, or Firm* — Staas & Halsey LLP (57) ABSTRACT

A communication control apparatus controls radio communications with other communication device through a relay device. The communication control apparatus includes a transmission control unit that notifies a data transmission to the relay device, and performs the data transmission to the relay device when the transmission control unit receives a response to the notification from the relay device indicating that the data transmission is possible, and stops a data transmission when the transmission control unit receives a response to a notification made by another communication device from the relay device, a collision conjecture unit that conjectures a collision of frames at the data transmission in accordance with a predetermined condition, and a threshold value control unit that sets a threshold value to determine an assertion or a negation of the transmission control unit in accordance with a result of the conjecture of the collision.

7 Claims, 5 Drawing Sheets

| FRAME COLLISION CONJECTURE VALUE | RTS/CTS THRESHOLD VALUE ALTERATION MAGNITUDE |
|---|---|
| 0 | −32 (byte) |
| 1 | +32 (byte) |
| 2 | +48 (byte) |
| ⋮ | ⋮ |
| 10 | +176 (byte) |

FIG. 5

COMMUNICATION CONTROL APPARATUS

CROSS-REFERENCE TO RELATED APPLICATION

This application is based upon and claims the benefit of priority of the prior Japanese Patent Application No. 2008-184184, filed on Jul. 15, 2008, the entire contents of which are incorporated herein by reference.

FIELD

Embodiments discussed herein relate to a communication control apparatus in a radio communication system.

BACKGROUND

A CSMA/CA (Carrier Sense Multiple Access with Collision Avoidance) scheme has been adopted as an access control scheme of a radio communication system.

In the radio communication system adopting the CSMA/CA scheme, however, when a plurality of radio terminal devices are about to simultaneously transmit radio frames to an identical access point under an environment in which the radio terminal devices cannot recognize each other, a collision of the radio frames from the individual radio terminal devices may take place. This problem is called the "hidden terminal problem".

The communication throughputs of the individual radio terminal devices in the radio communication system lower due to the collision of the radio frames.

In order to solve this problem, there has been used a technique wherein the communications between the radio terminal devices and the access point are appointed beforehand by utilizing RTS (Request To Send)/CTS (Clear To Send) functions.

In case of applying the RTS/CTS functions, each radio terminal device transmits an RTS packet that contains a scheduled appointment period to the access point before the radio terminal device transmits data to the access point. Upon receiving the RTS packet, the access point transmits CTS packets to the individual radio terminal devices. The radio terminal device having transmitted the RTS packet starts the data transmission by receiving the CTS packet from the access point. On the other hand, any other radio terminal device not having transmitted the RTS packet becomes incapable of transmitting data during the scheduled appointment period designated by the received CTS packet, when the other radio terminal device has received the CTS packet.

Owing to the utilization of the RTS/CTS functions, the collision of the radio frames is avoided, and hence, the "hidden terminal problem" is eliminated. On the other hand, however, the lowering of the communication throughputs poses a problem.

In this regard, there has been adopted a scheme that asserts the RTS/CTS functions in a case where the packet to be transmitted is equal to or larger than a predetermined size, and which negates the RTS/CTS functions in a case where the packet to be transmitted is smaller than the predetermined size. A value that determines the assertion/negation of the RTS/CTS functions, shall be called the "RTS/CTS threshold value" below.

Regarding the above technique, it has been known to properly use a multiple access scheme of collision channel and a multiple access scheme of non-collision channel in accordance with a communication traffic.

Also, a radio packet communication system including radio terminal devices each of which transmits an appointment signal in accordance with a transmission data quantity, and an access point that switches a contention mode and a polling mode on the basis of information obtained by totaling and averaging appointment quantities from the radio terminal devices has been known.

The following documents are documents which disclose techniques concerning communication systems:
Patent Document 1: JP-A-08-274788
Patent Document 2: JP-A-09-135248

However, there is no definite setting criteria for the RTS/CTS threshold value. Therefore, it has been difficult to determine the RTS/CTS threshold value suitable for the radio communication system.

Thus, various embodiments described herein determine the optimum RTS/CTS threshold value in accordance with a radio communication system.

SUMMARY

A communication control apparatus that controls radio communications with at least one other communication device through a relay device including a transmission control unit that notifies a data transmission to the relay device, and performs the data transmission to the relay device when the transmission control unit receives a response to the notification from the relay device indicating that the data transmission is possible, and stops a data transmission when the transmission control unit receives a response to a notification made by one of the at least one other communication devices from the relay device, a collision conjecture unit that conjectures a collision of frames at the data transmission in accordance with a predetermined condition, and a threshold value control unit that sets a threshold value to determine an assertion or a negation of the transmission control unit in accordance with a result of the conjecture of the collision.

A radio communication method for controlling a radio communication through a relay device includes notifying a data transmission to the relay device, performing the data transmission to the relay device when the relay device sent a response to the notification indicating that the data transmission is possible, and stopping a data transmission process when the relay device sent a response to a notification made by another radio terminal device, conjecturing a collision of transmission data in accordance with a predetermined condition, and setting a threshold value that determines an assertion or a negation of data transmission, in accordance with a result of the conjecture of the collision.

DESCRIPTION OF EMBODIMENTS

Embodiments of the invention will be described with reference to FIGS. 1 to 5.

Figure 1:
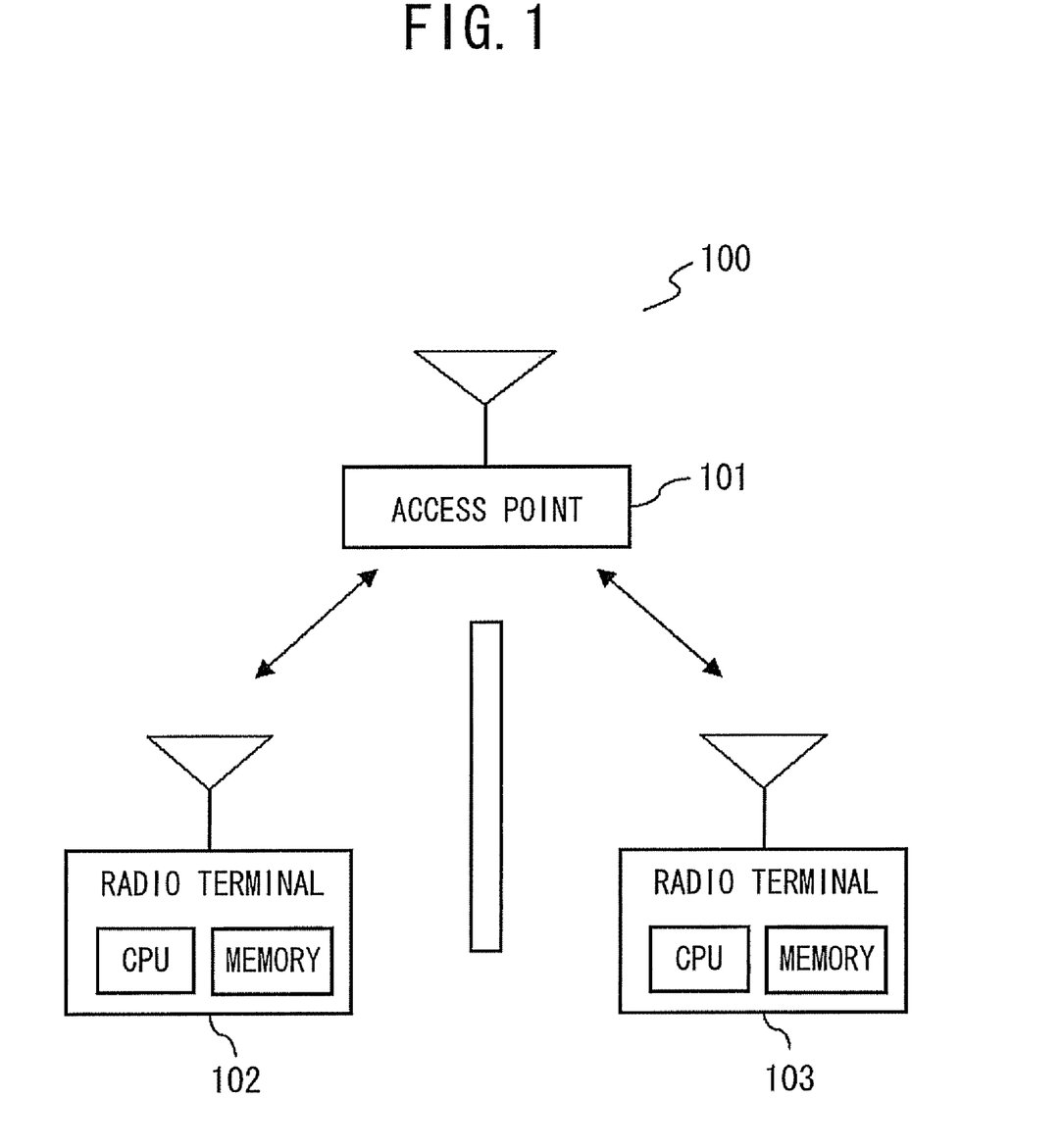
FIG. 1 illustrates a radio communication system environment according to one embodiment of the invention.

FIG. 1 illustrates a radio communication system according to an embodiment of the invention.

The radio communication system 100 according to the embodiment includes an access point 101 that connects radio terminal devices by radio communications, and radio terminal devices (may also be referred to as "portable terminal devices") 102 and 103 that are operable in an infrastructure mode. Incidentally, FIG. 1 is not intended to restrict the numbers of access points and radio terminal devices.

The portable terminal devices 102 and 103 communicate through the access point 101 with each other. During the communications through the access point 101, each of the portable terminal devices 102 and 103 conjectures the collision of radio frames, and each of the portable terminal devices 102 and 103 determines an RTS/CTS threshold value that determines the assertion/negation of RTS/CTS functions included in itself, from the result of the conjecture.

In the radio communication system 100, each of the portable terminal devices 102, 103 determines the RTS/CTS threshold value so that data communications may be performed with the RTS/CTS functions negated, at such a traffic at which the collision of the radio frame does no occur, and that the data communications may be performed with the RTS/CTS functions asserted, at such a traffic at which the collision of the radio frame occurs. Therefore, each of the portable terminal devices 102 and 103 switches the assertion/negation of the RTS/CTS functions in accordance with the determined RTS/CTS threshold value, whereby the hidden terminal problem can be eliminated with the throughput of each radio terminal device enhanced.

Figure 2:
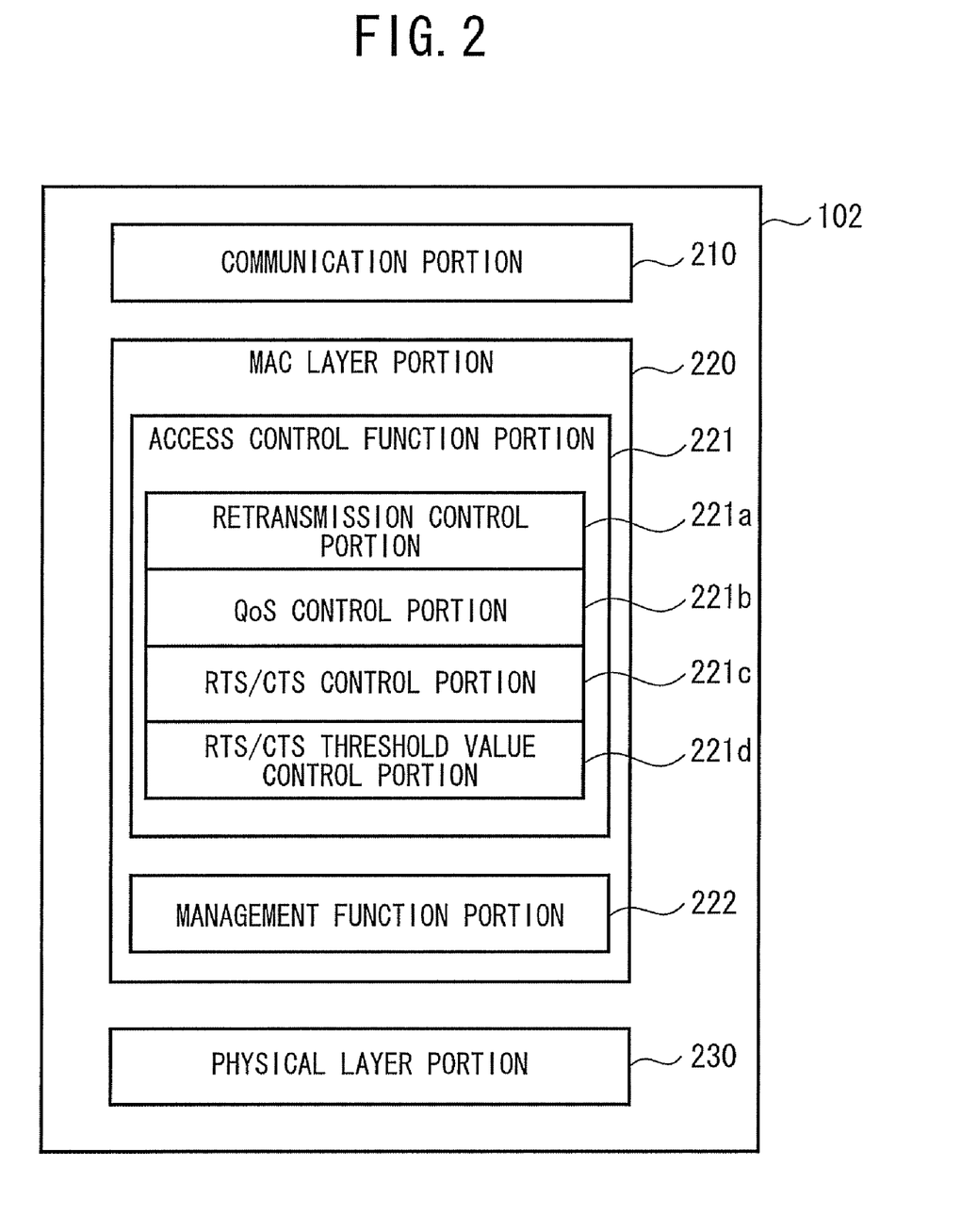
FIG. 2 illustrates a radio terminal device according to an embodiment.

FIG. 2 illustrates the radio terminal device according to the embodiment. The radio terminal device 102 will be described below, but the radio terminal 103 shall have the same configuration in the embodiment.

The radio terminal device 102 includes a communication portion 210 that processes communication data generated by executing any desired application for communications in accordance with a protocol, such as the TCP/IP. The radio terminal device 102 further includes a MAC layer portion 220 that controls the timing of a data transmission to a desired communication destination. The radio terminal device 102 further includes a physical layer portion 230 that transmits or receives radio frames in compliance with commands from the MAC layer portion 220.

The MAC layer portion 220 includes an access control function portion 221 that performs the access control of the CSMA/CA scheme, and a management function portion 222 that transmits or receives the radio frames by controlling the operation of the physical layer portion 230.

The access control function portion 221 includes a retransmission control portion 221a that performs the retransmission control of the radio frame, a QoS control portion 221b that performs an appropriate necessary QoS (Quality of Service) control, an RTS/CTS control portion 221c that performs an RTS/CTS control, and an RTS/CTS threshold value control portion 221d that controls the RTS/CTS threshold value.

The RTS/CTS control portion 221c compares the total quantity of the radio frames to be transmitted from the radio terminal device 102 in a fixed time period, and the RTS/CTS threshold value that has been set by the RTS/CTS threshold value control portion 221d. The RTS/CTS control portion 221c then switches the assertion/negation of the RTS/CTS functions in accordance with the result of the comparison. The number of bytes of the radio frames, for example, is referred to as the total quantity of the radio frames. When the total quantity of the radio frames that the radio terminal device 102 transmits in the fixed time period exceeds the RTS/CTS threshold value, the RTS/CTS control portion 221c asserts the RTS/CTS functions. In the case where the RTS/CTS functions are assertive, the RTS/CTS control portion 221c operates the RTS/CTS functions stated before.

Figure 3:
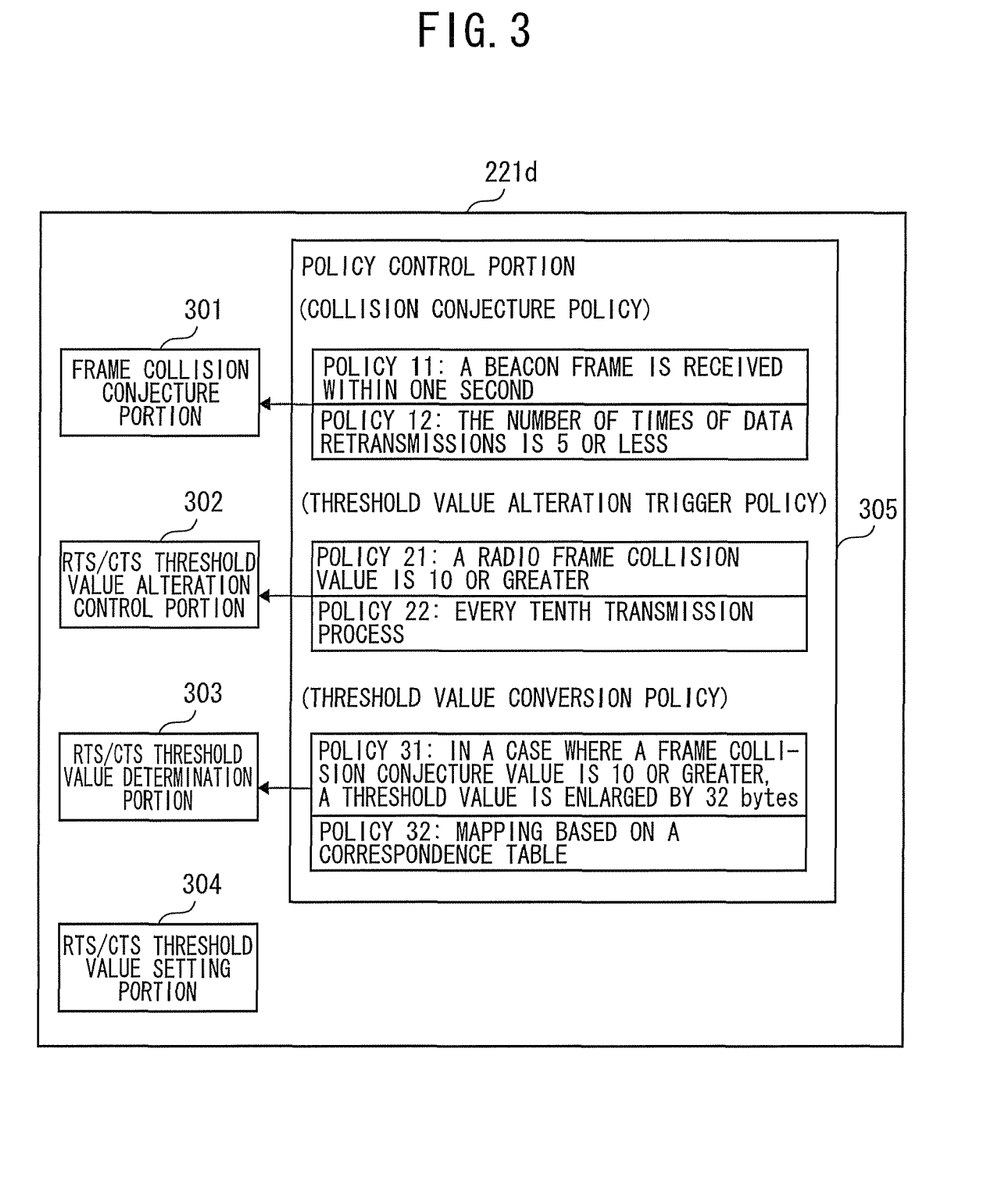
FIG. 3 illustrates an RTS/CTS threshold value control portion according to an embodiment.

FIG. 3 illustrates the RTS/CTS threshold value control portion 221d according to the embodiment.

The RTS/CTS threshold value control portion 221d illustrated in FIG. 3 includes a radio frame collision conjecture portion 301 that conjectures the collision of the radio frames, an RTS/CTS threshold value alteration control portion 302 that controls the timing of the alteration of the RTS/CTS threshold value, an RTS/CTS threshold value determination portion 303 that determines the RTS/CTS threshold value, an RTS/CTS threshold value setting portion 304 by which the RTS/CTS threshold value stored in a memory or the like is set at the threshold value determined by the RTS/CTS threshold value determination portion 303, and a policy control portion 305 by which policies to be applied to the radio frame collision conjecture portion 301 or the other portions are managed and controlled.

The frame collision conjecture portion 301 conjectures the collision of the radio frames on the basis of a collision conjecture policy designated by the policy control portion 305.

When the policy control portion 305 designates a policy 11, the frame collision conjecture portion 301 monitors every second whether or not a beacon frame is received. Also, in a case where the beacon frame is not received within the period of one second, the frame collision conjecture portion 301 conjectures that the collision of radio frames has occurred.

In addition, when the policy control portion 305 designates a policy 12, the frame collision conjecture portion 301 counts the number of times of retransmission processes executed by the retransmission control portion 221a, or acquires the number of times of retransmissions recorded in the header part of a radio frame. Also, the frame collision conjecture portion 301 monitors whether or not the number of times of retransmissions is 5 or less. In a case where the number of times of retransmissions is greater than 5, the frame collision conjecture portion 301 conjectures that the collision of radio frames has occurred.

The RTS/CTS threshold value alteration control portion 302 controls a timing for altering the RTS/CTS threshold value on the basis of a threshold value alteration trigger policy designated by the policy control portion 305.

When the policy control portion 305 designates a policy 21, the RTS/CTS threshold value alteration control portion 302 decides the number of times of collisions of the radio frames as conjectured by the frame collision conjecture portion 301. The conjectured number of times of collisions of the radio frames shall be called the "frame collision conjecture value" below. When the frame collision conjecture value becomes 10 or greater, the RTS/CTS threshold value alteration control portion 302 operates the RTS/CTS threshold value determination portion 303 or the RTS/CTS threshold value setting portion 304, so as to alter the RTS/CTS threshold old value.

When the policy control portion 305 designates a policy 22, the RTS/CTS threshold value alteration control portion 302 counts the number of times of transmission processes for the radio frames. The RTS/CTS threshold value alteration control portion 302 operates the RTS/CTS threshold value determination portion 303 or the RTS/CTS threshold value setting portion 304 every tenth transmission process for the radio frame, so as to alter the RTS/CTS threshold value.

The RTS/CTS threshold value determination area 303 determines the RTS/CTS threshold value on the basis of a threshold value conversion policy designated by the policy designated by the policy control portion 305.

When the policy control portion 305 designates a policy 31, the RTS/CTS threshold value determination portion 303 checks the frame collision conjecture value. Also, in a case where the frame collision conjecture value is 10 or greater, the RTS/CTS threshold value determination portion 303 sets a value obtained by adding 32 bytes to the present threshold value, as a new RTS/CTS threshold value.

Figure 4:
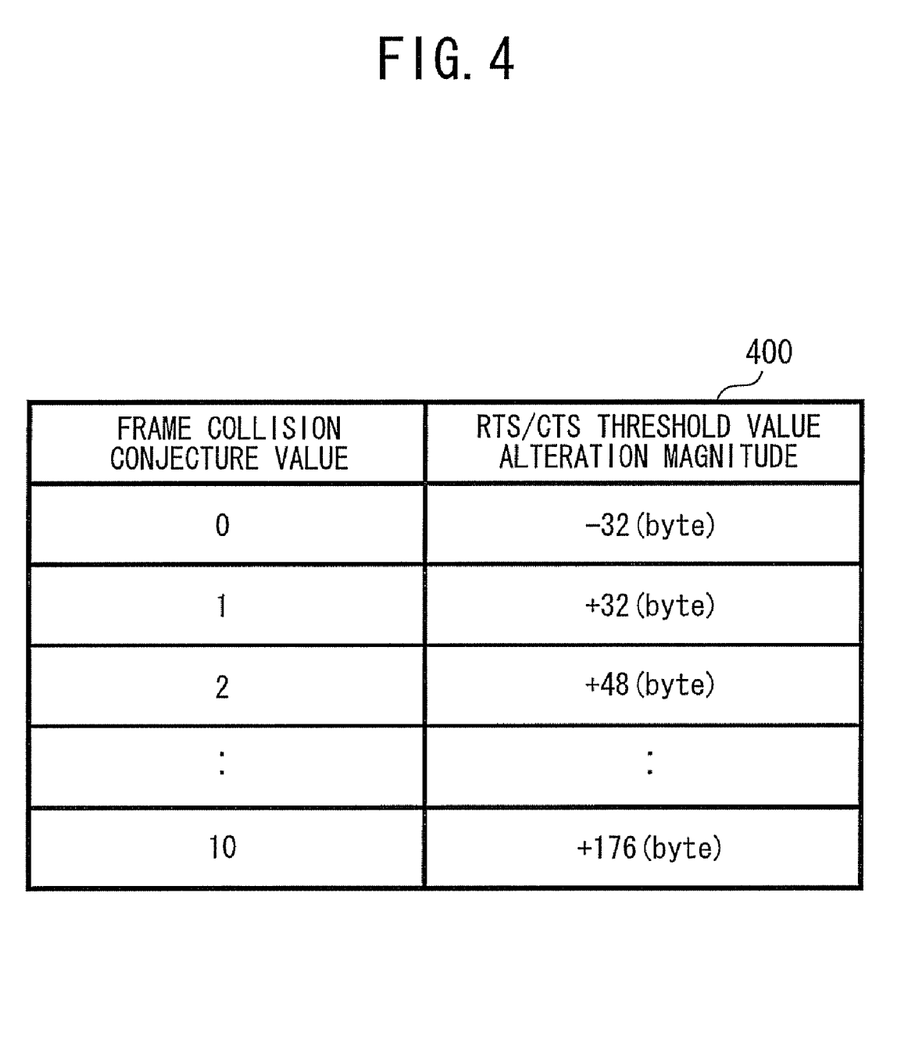
FIG. 4 illustrates an example of a correspondence table.

In addition, when the policy control portion 305 designates a policy 32, the RTS/CTS threshold value determination portion 303 refers to a correspondence table shown in FIG. 4. The RTS/CTS threshold value determination portion 303 then acquires an RTS/CTS threshold value alteration magnitude corresponding to the discriminated frame collision conjecture value, from the correspondence table. Also, the RTS/CTS threshold value determination portion 303 determines a value obtained by altering the present RTS/CTS threshold value by the RTS/CTS threshold value alteration magnitude acquired from the correspondence table, as a new RTS/CTS threshold value.

The RTS/CTS threshold value setting portion 304 alters an RTS/CTS threshold value stored in the predetermined address of a memory, not shown, included in the MAC layer portion 202 for example, to the new threshold value determined by the RTS/CTS threshold value determination portion 303.

The policy control portion 305 manages policies inputted from an input/output device or the like within the radio terminal device, or policies stored beforehand. The policies 11, 12, 21 and 22 stated above can be examples of the policies. The policy control portion 305 feeds the managed policies to the frame collision conjecture portion 301, the RTS/CTS threshold value alteration control portion 302, and the RTS/CTS threshold value determination portion 303, respectively, in compliance with commands from the input/output device or the like or in accordance with preset conditions (referred to as "policy setting conditions" hereinafter).

The policy control portion 305 designates the policy for the frame collision conjecture portion 301, in accordance with the policy setting condition such as "the policy 11 is designated as the collision conjecture policy", "the policy 12 is designated as the collision conjecture policy", "the policy 11 and the policy 12 are designated as the collision conjecture policies" or "the policy 11 or the policy 12 is designated as the collision conjecture policy". The policy control portion 305 similarly designates the threshold value alteration trigger policy and the threshold value alteration policy.

In FIG. 3, the two policies are indicated for each policy that is applied to the frame collision conjecture portion 301 (referred to as "collision conjecture policy"), the policy that is applied to the RTS/CTS threshold alteration control portion 302 (referred to as "threshold value alteration trigger policy"), and the policy that is applied to the RTS/CTS threshold value determination portion 303 (referred to as "threshold value conversion policy"). The exemplary indication in FIG. 3, however, is not intended to restrict the number of the policies.

FIG. 4 illustrated an example of a correspondence table 400 in which the frame collision conjecture value and the RTS/CTS threshold value used for the threshold value alteration trigger policy are associated.

The correspondence table 400 illustrated in FIG. 4 retains the frame collision conjecture value conjectured to be the radio frame collision by the frame collision conjecture portion 301 in the predetermined period, and the alteration magnitude (in bytes) from the present RTS/CTS threshold value.

In FIG. 4, in a case where the frame collision conjecture value is "0", the alteration magnitude of the RTS/CTS threshold value is −32 bytes. Also, in a case where the frame collision conjecture value is "1", the alteration magnitude of the RTS/CTS threshold value is +32 bytes.

In a case where the frame collision conjecture value is large, the threshold value alteration magnitude is enlarged to increase the RTS/CTS threshold value, and to prevent the RTS/CTS functions from being asserted, to the utmost, whereby the communication throughput can be suppressed from lowering.

Also, in a case where the frame collision conjecture value is zero, the threshold value alteration magnitude is made negative to decrease the RTS/CTS threshold value and to facilitate the assertion of the RTS/CTS functions, whereby the "hidden terminal problem" and the like drawback ascribable to the collision of the radio frames can be eliminated.

Incidentally, the frame collision conjecture values and RTS/CTS threshold value alteration magnitudes indicated in FIG. 4 are exemplary, and restrictions to the indicated quantities are not intended. Besides, in the examples of FIG. 4, also the RTS/CTS threshold values are indicated in byte units, but restrictions to the examples are not intended.

Figure 5:
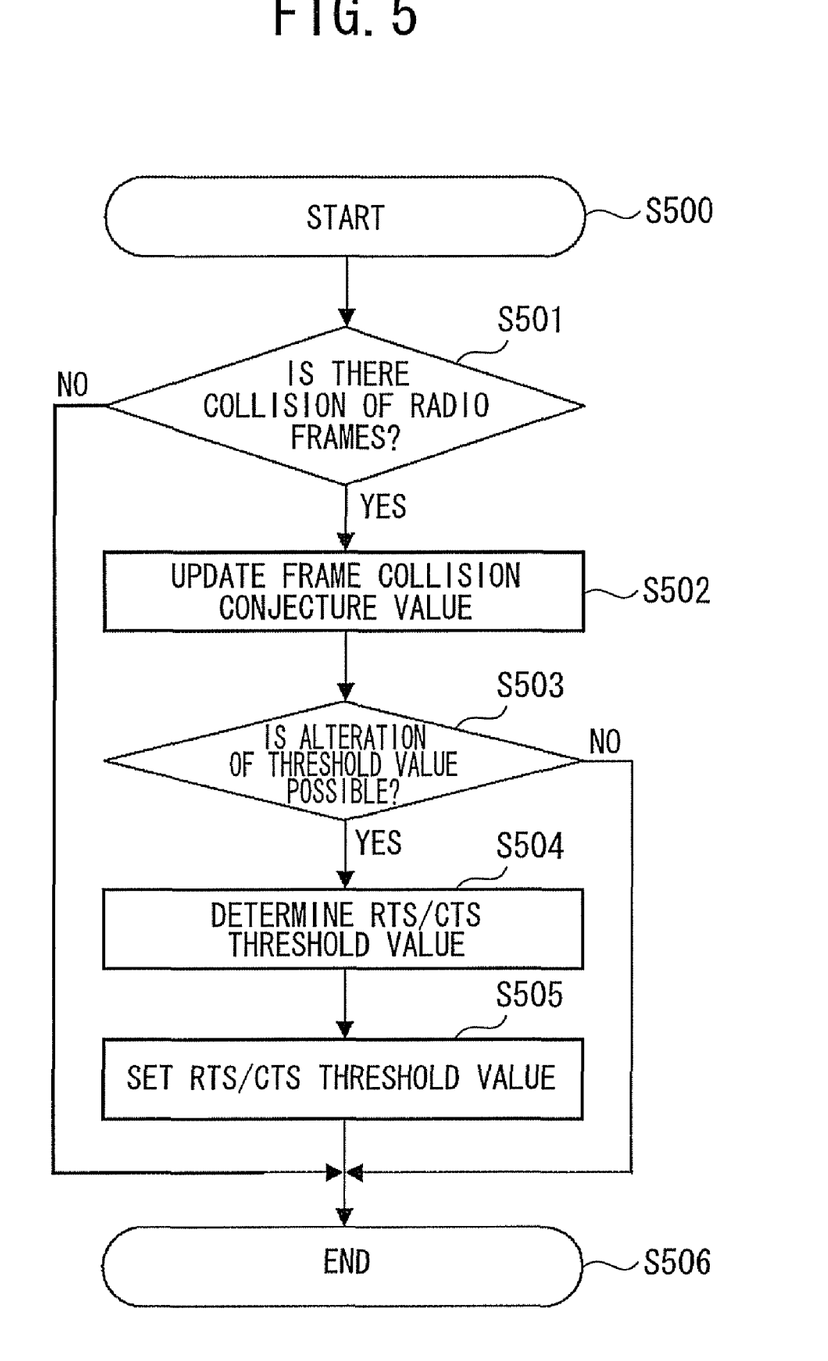
FIG. 5 is a flowchart illustrating a process of the RTS/CTS threshold value control portion.

FIG. 5 is a flow chart illustrating the process of the RTS/CTS threshold value control portion 221 that is included in the radio terminal device according to the embodiment. The process of the radio terminal device 102 will be described below.

Each time the access control function portion 221 included in the radio terminal device 102 transmits data (a packet) to a transmission destination, the access control function portion 221 commands the RTS/CTS threshold value control portion 221d to execute an RTS/CTS threshold value control process. Then, the RTS/CTS threshold value control portion 221d starts the RTS/CTS threshold value control process in compliance with the command of the access control function portion 221 (S500).

At S501, the frame collision conjecture portion 301 conjectures the existence or nonexistence of the collision of radio frames in accordance with the collision conjecture policy designated by the policy control portion 305. Also, in a case where the collision conjecture policy is satisfied, the frame collision conjecture portion 301 judges that the collision of the radio frames has occurred (S501 YES), and the processing shifts to S502.

On the other hand, in a case where the collision conjecture policy is not satisfied, the frame collision conjecture portion 301 judges that the collision of the radio frames has not occurred (S501 NO), and the processing shifts to S506.

At S502, the frame collision conjecture portion 301 updates the frame collision conjecture value stored in the predetermined address of the memory that is included in, for example, the RTS/CTS threshold value control portion 221d. In the example of FIG. 5, the frame collision conjecture portion 301 increments the frame collision conjecture value stored in the memory, by +1.

At S503, the RTS/CTS threshold value alteration control portion 302 judges whether or not the alteration process for the RTS/CTS threshold value is to be executed, in accordance with the threshold value alteration trigger policy designated by the policy control portion 305. Also, in a case where the RTS/CTS threshold value alteration control portion 302 has judged that the alteration of the RTS/CTS threshold value is possible (S503 YES), the RTS/CTS threshold value alteration control portion 302 executes the processing of S504. On the other hand, in a case where the RTS/CTS threshold value alteration control portion 302 has judged that the RTS/CTS threshold value alteration is unnecessary (S503 NO), the RTS/CTS threshold value alteration control portion 302 shifts the processing to S506.

In a case where the policy 21 has been applied, the RTS/CTS threshold value alteration control portion 302 refers to the frame collision conjecture value stored in the memory. In a case where the frame collision conjecture value referred to is 10 or greater, the RTS/CTS threshold value alteration control portion 302 judges that the RTS/CTS threshold value alteration is possible, and the RTS/CTS threshold value alteration control portion 302 shifts the processing to S504.

Also, in a case where the frame collision conjecture value referred to is 9 or less, the RTS/CTS threshold value alteration control portion 302 judges that the threshold value is not altered, and the RTS/CTS threshold value alteration control portion 302 shifts the processing to S506 (S503 NO).

At S504, the RTS/CTS threshold value determination portion 303 determines the RTS/CTS threshold value in accordance with the threshold value conversion policy designated by the policy control portion 305.

In a case where the policy 31 has been applied, the RTS/CTS threshold value determination portion 303 refers to the present RTS/CTS threshold value. In addition, the RTS/CTS threshold value determination portion 303 sets a value obtained by adding 32 bytes to the RTS/CTS threshold value referred to, as the new RTS/CTS threshold value.

On the other hand, in a case where the policy 32 has been applied, the RTS/CTS threshold value determination portion 303 refers to the correspondence table 400 shown in FIG. 4, and the RTS/CTS threshold value determination portion 303 acquires the RTS/CTS threshold value alteration magnitude corresponding to the frame collision conjecture value referred to, from the memory. In addition, the RTS/CTS threshold value determination portion 303 sets a value obtained by adding the acquired RTS/CTS threshold value alteration magnitude to the present RTS/CTS threshold value, as the new RTS/CTS threshold value.

At S505, the RTS/CTS threshold value setting portion 304 refers to the predetermined address of the memory, which is included in, for example, the MAC layer portion 202, and the RTS/CTS threshold value setting portion 304 alters the RTS/CTS threshold value stored in the memory, to the new RTS/CTS threshold value determined at S504. In addition, the RTS/CTS threshold value setting portion 304 shifts the processing to S506.

When the above processing has ended to alter the RTS/CTS threshold value, the RTS/CTS control portion 221c judges whether or not the RTS/CTS functions are to be executed, in accordance with the new RTS/CTS threshold value.

As described above, in the radio terminal device 102 according to the embodiment, the frame collision conjecture portion 301 conjectures the collision of the radio frames on the basis of the collision conjecture policy, the RTS/CTS threshold value determination portion 303 determines the optimum RTS/CTS threshold value in accordance with the number of times of the collisions, and the RTS/CTS threshold value setting portion 304 sets the new threshold value as the RTS/CTS threshold value. It is therefore permitted to set the RTS/CTS threshold value that is suited to the radio communication system environment 100 where the radio terminal device 102 is located.

In addition, the RTS/CTS control portion 221c compares the RTS/CTS threshold value set anew and the size of the packet to-be-transmitted, and the RTS/CTS control portion 221c switches the assertion/negation of the RTS/CTS functions on the basis of the result of the comparison. In a case where the packet to-be-transmitted is smaller than the RTS/CTS threshold value set anew, the RTS/CTS control portion 221c switches the RTS/CTS functions to the negation. On the other hand, in a case where the packet to-be-transmitted is not smaller than the RTS/CTS threshold value, the RTS/CTS control portion 221c switches the RTS/CTS functions to the assertion. In this manner, the RTS/CTS threshold value is set in accordance with the environment where the radio communication system 100 is located, so that the switching of the assertion/negation of the RTS/CTS functions can be also performed in accordance with the environment of the radio communication system 100. In the embodiment, therefore, the communication throughputs can be enhanced in the radio communication system environment 100 where the radio terminal device 102 is located, with the hidden terminal problem eliminated.

Also, in the determination process for the RTS/CTS threshold value according to the embodiment, the access point 101 need not participate in the determination of the RTS/CTS threshold value. That is, the optimum RTS/CTS threshold value can be determined in accordance with the radio communication system environment 100, only with the radio terminal device 102 without performing the addition or alteration of any special function for the access point 101. It is therefore facilitated to introduce the determination process for the RTS/CTS threshold value as described in the embodiment.

Also, in a case where the RTS/CTS threshold value is determined on the side of the access point 101, the determined RTS/CTS threshold value needs to be always notified from the access point 101 to the radio terminal device 102. That is, a communication process which is originally unnecessary increases. In the embodiment, the optimum RTS/CTS threshold value corresponding to the radio communication system is determined without increasing such an unnecessary communication process, and the communication processing is executed while switching the assertion/negation of the RTS/CTS functions in accordance with the threshold value, whereby the communication throughputs can be enhanced.

The embodiments described herein can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A communication control apparatus that controls radio communications with at least one other communication device through a relay device, the communication control apparatus comprising:
   a controller that notifies a data transmission to the relay device, and performs the data transmission to the relay device when the controller receives a response to the notification from the relay device indicating that the data transmission is possible, and stops a data transmission when the controller receives a response to a notification made by the other communication devices from the relay device;
   a collision conjecture processor that conjectures a collision of frames at the data transmission in accordance with a predetermined condition; and
   a threshold value control processor that sets a threshold value to determine an assertion or a negation of the controller in accordance with a result of the conjecture of the collision, the threshold value control processor including:
      a frame collision conjecture processor that discriminates whether or not a first condition for deciding the collision of the frames and transmission/reception states of the frames correspond, conjectures that the frame collision has occurred in a case where the frame transmission or the frame reception states satisfy the first condition, and counts the number of times of occurrences of the frame collisions;
      a threshold value determination processor that determines a new threshold value that corresponds to the number of times of occurrences of the frame collisions as counted by the frame collision conjecture processor in accordance with a second condition for a threshold value alteration; and
      a threshold value setting processor that alters a threshold value stored in threshold value storage unit to the new threshold value determined by the threshold value determination processor.

2. A communication control apparatus according to claim 1, wherein said controller compares data to be transmitted and the threshold value, and performs the notification to the relay device in a case where a data quantity of the data is larger than the threshold value.

3. A communication control apparatus according to claim 1, wherein the threshold value control unit includes a threshold value alteration control unit that discriminates whether or not a third condition for a new threshold value alteration and the transmission/reception states of the frames agree, and that grants the alteration of the threshold value that switches the assertion/negation of the transmission control unit in a case in which the frame transmission/reception states satisfy the third condition.

4. A communication control apparatus according to claim 3, wherein the threshold value control unit includes a condition control portion that generates the first condition from one or more frame collision conjecture conditions that are applied to the frame collision conjecture unit, the second condition from one or more threshold value determination conditions that are applied to the threshold value determination unit, and the third condition from one or more threshold value alteration conditions that are applied to the threshold value alteration control unit.

5. A communication control apparatus according to claim 1, wherein the threshold value control unit sets the threshold value in accordance with the number of times of frame collisions that have been conjectured as the collisions by the collision conjecture unit.

6. A radio communication method for controlling a radio communication through a relay device, the method comprising:
   notifying a data transmission to the relay device;
   performing the data transmission to the relay device when the relay device sent a response to the notification indicating that the data transmission is possible, and stopping a data transmission process when the relay device sent a response to a notification made by another radio terminal device;
   conjecturing a collision of transmission data in accordance with a predetermined condition;
   setting a threshold value that determines an assertion or a negation of data transmission, in accordance with a result of the conjecture of the collision;
   discriminating whether or not a first condition for deciding the collision of the frames and transmission/reception states of the frames correspond, conjecturing that the frame collision has occurred in a case where the frame transmission or the frame reception states satisfy the first condition, and counting the number of times of occurrences of the frame collisions;
   determining a new threshold value that corresponds to the number of times of occurrences of the frame collisions as counted by the counting in accordance with a second condition for a threshold value alteration; and
   altering a threshold value stored in storing to the new threshold value determined by the determining.

7. A non-transitory recording medium readable by a computer in which a program allowing a radio communication terminal device to execute a communication control through a relay device is stored, the program comprising:
   performing a data transmission to the relay device when the radio communication terminal device receives a response to a notification sent to the relay device from the relay device indicating that the data transmission is possible, and stopping a data transmission process when the radio communication terminal device receives a response to a notification made by another radio terminal device from the relay device;
   conjecturing a collision of transmission data in accordance with a predetermined condition;
   setting a threshold value that determines an assertion/a negation of data transmission, in accordance with a result of the conjecture of the collision;
   discriminating whether or not a first condition for deciding the collision of the frames and transmission/reception states of the frames correspond, conjecturing that the frame collision has occurred in a case where the frame transmission or the frame reception states satisfy the first condition, and counting the number of times of occurrences of the frame collisions;
   determining a new threshold value that corresponds to the number of times of occurrences of the frame collisions as counted by the counting in accordance with a second condition for a threshold value alteration; and
   altering a threshold value stored in storing to the new threshold value determined by the determining.

* * * * *